United States Patent [19]

Joy

[11] 3,726,943
[45] Apr. 10, 1973

[54] ETHYLENICALLY UNSATURATED MONOMER POLYMERIZATION WITH SILYL ACYL PEROXIDES AND ACYL PEROXY POLYSILOXANES

[75] Inventor: John R. Joy, Stevenson, Md.

[73] Assignee: Union Carbide Corporation, New York, N.Y.

[22] Filed: Aug. 12, 1971

[21] Appl. No.: 171,356

Related U.S. Application Data

[62] Division of Ser. No. 82,817, Oct. 21, 1970.

[52] U.S. Cl.............260/827, 117/47 R, 117/123 D, 117/135.1, 117/138.8 R, 117/138.8 A, 117/138.8 D, 117/138.8 E, 117/138.8 F, 117/138.8 G, 117/138.8 N, 117/138.8 UA, 117/139.5 A, 117/141, 117/148, 117/169 R, 117/169 A, 260/37 SB, 260/41 B, 260/46.5 R, 260/46.5 E, 260/46.5 Y, 260/46.5 G, 260/77.5 R, 260/77.5 AP, 260/448.2 B, 260/448.2 N

[51] Int. Cl...............................................C08f 35/02

[58] Field of Search....................260/46.5 R, 46.5 E, 260/46.5 Y, 46.5 G, 827, 77.5 R, 77.5 AP, 448.2 B, 448.2 N

[56] References Cited

UNITED STATES PATENTS 2,963,501  12/1960  Plueddemann....................260/448.2

Primary Examiner—Donald E. Czaja
Assistant Examiner—Melvyn I. Marquis
Attorney—Paul A. Rose, George A. Skoler and Aldo J. Cozzi

[57] ABSTRACT

There is described herein a copolymer formed by the polymerization of a) a polysiloxane of a silyl acylperoxy compound containing at least one of the following structures;

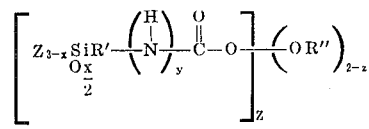

wherein R' is an alkylene, aralkylene or alkarylalkylene radical, R'' is an alkyl or aralkyl radical, Z is a monovalent hydrolyzable radical or monovalent organic radical bonded to the silicon atom by a carbon to silicon bond and wherein $x$ is an integer from 0 to 3 inclusive, and provided that when $x$ is greater than zero, the oxygen atom is in turn bonded to another silicon whereby to form a siloxane, wherein said siloxane and any remaining siloxane units in said siloxane composition are of the formula;

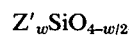

wherein Z' is Z or

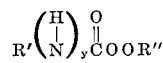

wherein Z, R', R'' and $y$ are as herein defined and $w$ is 1 to 3 inclusive; $y$ is 0 to 1, and $z$ is 1 or 2; with the proviso that when $y$ is 0, the acyl carbonyl carbon is bonded to R', the R' having at least 2 sequential carbon atoms separating the acyl carbonyl carbon atom from the silicon atom; with the further proviso that when $y$ is 1, $z$ is 1 and the nitrogen atom is bonded to a carbon atom of R', the R' having at least 3 sequential carbon atoms separating the nitrogen from the silicon atom, and b) an ethylenically unsaturated monomer.

10 Claims, No Drawings

ETHYLENICALLY UNSATURATED MONOMER POLYMERIZATION WITH SILYL ACYL PEROXIDES AND ACYL PEROXY POLYSILOXANES

This is a division of application Ser. No. 082,817 filed Oct. 21, 1970.

This invention relates to silyl acyl peroxides in the form of silanes or siloxanes. Specifically this invention relates to silyl acyl peroxides in which the acyl carbonyl carbon atom is separated by at least 2 sequential carbon atoms of an alkylene or aralkylene radical from the silicon atom to which it is bonded. This invention also relates to silyl carbamyl peroxides in which an acyl peroxy carbonyl carbon atom is bonded to a nitrogen atom which in turn is separated by at least 3 sequential carbon atoms of an alkylene or aralkylene radical from the silicon atom to which it is bonded. This invention also encompasses silyl acyl peroxides in which the silicon atom is bonded to hydrolyzable functional radicals such as halide, alkoxy, aroxy, acyloxy and the like.

This invention also relates to copolymers produced by the copolymerization of the aforesaid silyl acyl peroxides with one or more ethylenically unsaturated monomers and encompasses copolymers of the ABA block copolymer type wherein A is the repeating units resulting from the ethylenically unsaturated monomer and B is a polysiloxane chain.

Previous efforts have been made in the art to produce silicon compounds containing peroxide functions bonded to silicon through a carbon to silicon bond. Though there have been successes in producing such compounds containing the peroxide function, the resulting compound possessed little more utility than a conventional wholly organic peroxide, and had the additional disadvantage of costing substantially more to produce. The fault with such previous efforts lies in the fact that these silicon compounds were devoid of the hydrolyzable and condensable functionality bonded directly to silicon which was proven important in silicone chemistry in creating desirable silicon polymers of either resinous, oily or rubbery properties. In order to incorporate the peroxide function into a silicone structure, the prior art required incorporation of the peroxide function into special silicone polymers of limited structures, and these were devoid of residual hydrolyzable and condensable functionality. As a result, the prior art has produced such compounds either as non-hydrolyzable silanes or as oily, fully condensed silicone polymers.

For example, U.S. Pat. No. 2,963,501 discloses certain fully-condensed organo silylhydroperoxides. These hydroperoxides were formed by the reaction of the corresponding organosilicon alcohol with hydrogen peroxide in the presence of sulfuric acid. This strong acid reaction would of course attack any hydrolyzable functional groups, if they were present, and therefore none are present.

This same patent discloses a second reaction in which the aforedescribed fully-condensed organo silyl hydroperoxides are reacted with a hydrocarbon acyl chloride in the presence of a hydrogen halide acceptor, such as pyridine, to form a corresponding organo silyl peroxide having a terminal hydrocarbon acyl radical and co-product HCl. The product thus formed is not the compound of this invention. Firstly, there are no hydrolyzable functional groups bonded to the silicon nor could there logically be such reactive groups in that disclosure for reasons discussed. Secondly, the acyl carbonyl structure is terminally added to the silyl peroxy structure in that patent whereas this invention discloses a silyl acyl peroxy structure wherein the acyl carbonyl structure is bonded both to the organo silyl structure and to the peroxy structure. Thus the diacyl silyl peroxy compounds useful in polymerization initiation of monomers having olefinic unsaturation can be produced and are also a part of this invention. But a diacyl silyl structure could not be formed by the disclosure of U.S. Pat. No. 2,963,501 because of single terminus acyl carbonyl substitution reaction disclosed therein.

The silyl acyl peroxides of this invention in the form of silanes having hydrolyzable functional radicals have a distinct advantage over the prior art when these silanes are employed as coupling agents, insofar as these silanes, through hydrolysis and condensation tenaciously bond the resulting siloxane to inorganic oxide substrates to allow the peroxy functionality react with an organic substrate supplied in contact with the inorganic oxide.

The organosilyl peroxides of U.S. Pat. No. 2,963,501 are disclosed as being useful in vulcanizing rubbers but cannot bond inorganic substrates to organic substrates in the manner afore-described.

Further the silyl acyl peroxides of this invention when used as initiators for the polymerization of olefins offer a distinct advantage over prior art peroxy initiators in that the resulting olefin polymers through co-reaction with the silyl acyl peroxides contain silyl hydrolyzable functional end groups capable of further bond formation.

This invention relates to silyl acyl peroxy compounds containing at least one of the following structures;

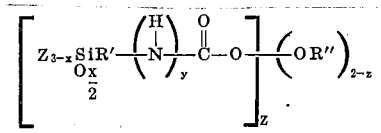

wherein R' is a divalent hydrocarbon radical such as alkylene, aralkylene or alkarylalkylene radical, R'' is an alkyl or aralkyl radical, Z is a monovalent hydrolyzable radical or monovalent organic radical bonded to the silicon atom by a carbon to silicon bond and wherein x is an integer from 0 to 3 inclusive, and provided that when x is greater than zero, the oxygen atom is in turn bonded to another silicon whereby to form a siloxane homopolymer or a copolymer wherein the co-mers are siloxane units of the formula:

$$Z'_w SiO_{4-w/2}$$

wherein Z' is Z or

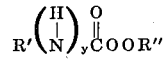

and wherein w is 1 to 3 inclusive; y is 0 or 1, and z is 1 or 2; with the proviso that when y is 0, the acyl carbonyl carbon is bonded to R', the R' having at least 2 sequential carbon atoms separating the acyl carbon atom from the silicon atom; with the further proviso that when y is 1, z is 1 and the nitrogen atom is bonded to R', the R' having at least 3 sequential carbon atoms separating the nitrogen from the silicon atom.

Illustrative of the classes of acyl peroxides silanes included in this invention are;

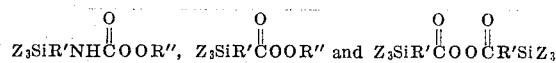

wherein R', R'' and Z are hereinbefore defined.

This invention also relates to silyl acyl peroxy compounds, as aforesaid, wherein said compounds are acyl peroxy polysiloxanes.

It is well known in the art that halosilanes, alkoxysilanes, aroxysilanes, acyloxysilanes, aminosilanes and hydrosilanes can be hydrolyzed to form silanols, silanetriols, depending upon their degree of hydrolyzable functionality. These silanols can be condensed or co-condensed to form networks of siloxane chains. Generally, under normal commercial usage, the silanediols and triols are unstable transitory materials and readily condense to siloxane; and exist, when they do exist, only in water. Cross-linking of siloxane chains, by establishing Si-O-Si bridges across the siloxane chains, occurs when one of the silanols contains at least three functional groups. In these reactions the composition of the final product is controlled by suitable proportioning of the hydrolyzable silanes and the organo radicals/silicon ratio in the mixture of intermediates being substantially the same as that in the product.

It is within the contemplation of this invention to form multitudinous siloxane copolymers by the co-condensation of the intermediates of the function silyl acyl peroxides, pursuant to this invention, with other silane intermediates.

By selection of functional silanes, polysiloxanes of a wide range of molecular weights can be formed and any degree of polymerization is obtainable from oils to gums to resins.

By way of example, the following more specific acyl peroxy polysiloxanes are within the contemplation of this invention;

wherein R is an alkyl radical of from about one to 12 carbon atoms and $a$ is any number from about 2 to 200, and wherein R', R'' and $y$ are hereinbefore defined; and

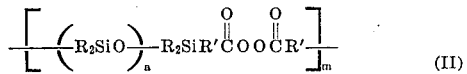

wherein $m$ is a number from about 10 to 200 and wherein polymer II terminal end-blocking groups are monovalent organic radicals resulting from the formation of II and wherein R', R'', R, $y$ and $a$ are hereinbefore defined.

It has also been found pursuant to this invention that the polysiloxanes encompassed by formulae (I) and (II) copolymerized with monomers having olefinic unsaturation to form a wide range of copolymers. These siloxane copolymers are useful as plasticizers or surfactants.

Specifically illustrative of a class of copolymers pursuant to this invention are ABA type block copolymers of acyl peroxy polysiloxanes I and II with monomers having ethylenic unsaturation, wherein A represents the old polymer chain unit resulting from the monomer having unsaturation and B represents the ethylenic polysiloxane chain unit. Not being bound by any proposed theory, initiation of the copolymerization is believed to occur by thermal degradation of the acyl peroxide,

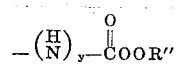

to form the free radicals

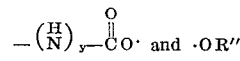

or degradation of the diacyl peroxide,

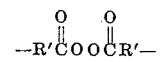

to form free radicals,

The ethylenic-peroxy copolymerization is carried out in an inert gas environment, such as argon, neon or xenon. The temperature of the reaction is important insofar as being sufficiently high to thermally degrade the peroxy bond and yet sufficiently low to prevent other undesirable reactions. Reaction temperatures generally range from about 60°C. to 250°C. and reaction periods generally from about 1 to 10 hours.

Essentially all monomers having ethylenic unsaturation capable of polymerization are suitable for use pursuant to this invention. Illustrative of such ethylenically unsaturated monomers include the alkenes such as ethylenes as propene, butene, octene, decene and the like, preferably the alkenes having terminal carbon-carbon unsaturation such as propene, 1-octene, 1-decene and the like; the aryl alkenes, preferably styrene, α-methylstyrene, and the like; the vinyl esters such as vinyl acetate, vinyl propionate; acrylic monomers such as acrylic acid, methyl methacrylate, methylacrylate, 2-ethyl-n-hexyl-acrylate, acrylamide, acrylonitrile and the like: divinyl phenyls such as divinyl benzene and the like; vinyl naphthyls; alkadienes, such as 1,3-butadiene; isoprene, chloroprene, and the like; vinyl halides such as vinyl chloride, vinyl fluoride and the like; vinylidene halides such as vinylidene bromide, vinylidene flouride vinylidene chloride and the like.

The silyl acyl peroxides of this invention can be prepared by the addition reaction, in the presence of a catalyst, of a compound having silanic hydrogen with an acyl peroxide having carbon-carbon unsaturation. Preferably the unsaturation is terminal carbon-carbon unsaturation. This reaction is carried out at moderate temperatures of about 25°C. for periods up to 100 hours or more, if required and is illustrated as follows;

wherein R', R'' and Z are as hereinbefore defined, R''' is a divalent hydrocarbon such as alkylene, alkarylene, alkarylalkylene or arylene having 2 less sequential carbon atoms than R'.

The silyl carbamyl peroxides of this invention, can be prepared by the reaction of an silylorgano isocyanate with an alkyl hydroperoxide at moderate temperatures of about 25°C., to 100°C., for periods up to about 25 hours or more, in the presence of a catalyst, as follows;

$$Z_3SiR'N=C=O + HOOR'' \longrightarrow Z_3SiR'NH\overset{O}{\underset{\|}{C}}OOR''$$

wherein R', R'' and Z are hereinbefore defined.

The disilyl diacyl peroxides of this invention can be prepared by the addition reaction, under reaction conditions similar to those for the monosilyl acyl peroxides, of a compound containing silanic hydrogen with a poly-unsaturated diacyl peroxide. Preferably the unsaturation is in the terminal positions, as shown as follows;

$$2Z_3SiH + CH_2=CHR'''\overset{O}{\underset{\|}{C}}OO\overset{O}{\underset{\|}{C}}R'''CH=CH_2 \longrightarrow$$
$$Z_3SiR'\overset{O}{\underset{\|}{C}}OO\overset{O}{\underset{\|}{C}}R'SiZ_3$$

wherein R', R''', and Z, are as hereinbefore defined.

The above reactions may be carried out in the presence or absence of a solvent which is inert to the functional groups, —N=C=O, —OOH, or =SiH. Examples of such solvents are aliphatic hydrocarbons such as hexane or heptane, cycloaliphatic hydrocarbons such as cyclohexane, aromatic hydrocarbons, such as benzene or toluene. Preferably the reaction is carried out in the presence of a solvent. The operating temperature is not critical in the above reactions, but it is advantageously operated between about 25°C. and about 100°C. Preferably the reaction is carried out at temperatures near 25°C. for periods up to about 100 hours or more. The catalysts employed for the addition reaction of the unsaturated acyl peroxide to Si-H are preferably derivatives of group VIII metals, such as ruthenium or platinum derivatives, for example bis(4-chlorobenzonitrile) dichloroplatinum (II) and 1,3-distyrene-2,4-dichloro-$\mu$-dichloroplatinum (II). In the isocyanate-hydroperoxide reaction the catalysts employed are preferably derivatives of the higher group IV metals, preferably tin (II), for example stannous octoate, but may also be organoamines such as triethylamine and the like.

The polymers as represented by general formulas I and II can be prepared, under the reaction conditions of the hereinbefore described monomer syntheses, with polyfunctional reactions, as follows;

$$H(R_2SiO)_aR_2SiH + CH=CHR'''\overset{O}{\underset{\|}{C}}OO\overset{O}{\underset{\|}{C}}R'''CH=CH \longrightarrow$$
$$\left[(R_2SiO)_aR_2SiR'COOCR'\right]_m \quad (II)$$

wherein R, R', R''' and m, are as hereinbefore defined, and $$H(R_2SiO)_aR_2SiH + CH_2=CHR'''\overset{O}{\underset{\|}{C}}OOR'' \longrightarrow$$
$$R''OO\overset{O}{\underset{\|}{C}}R'(R_2SiO)_aR_2SiR'\overset{O}{\underset{\|}{C}}OOR'' \quad (I)$$

wherein R, R', R'', R''' and a, are as hereinbefore defined, and
$$H(R_2SiO)_aR_2SiH + 2CH_2=CHR'''N=C=O \longrightarrow O=C=NR'(R_2SiO)_aR_2SiR'N=C=O \quad (IV)$$

followed by, (IV) + HOOR'' $\longrightarrow$
$$R''OO\overset{O}{\underset{\|}{C}}NHR'_2(R_2SiO)_aR_2SiR'_2NH\overset{O}{\underset{\|}{C}}OOR'' \quad (I)$$

wherein R, R', R'', R''' and a, are as hereinbefore defined and wherein the reaction of the intermediate isocyanate (IV) with the hydroperoxide is carried out in the presence of a catalyst, preferably of the class $R_3N$, wherein R is hereinbefore defined, and a preferred catalyst is triethylamine, at temperatures from 25°C. to 100°C.

It is understood that in the afore-described monoolefin and polysiloxane reactions, an active hydrogen of the polysiloxane may alternatively be located along the polymer chain in contradistinction to a terminal position, in which case the resultant polymer chain will contain pendant silyl acyl peroxy or silyl carbamyl peroxy radicals.

In the above polymer syntheses R is preferably methyl and R'' is preferably cumyl or tertiary-butyl.

Illustrative of hydroperoxides suitable in the aforesaid isocyanate-hydroperoxide reactions are the following: methyl hydroperoxide, ethyl hydroperoxide, propyl hydroperoxide, isopropyl hydroperoxide, n-butyl hydroperoxide, sec-butyl hydroperoxide, t-butyl hydroperoxide, t-amyl hydroperoxide, 1,1-diethylpropyl hydroperoxide, 1,1,2-trimethylpropyl hydroperoxide, 1-methylhexyl hydroperoxide, 1,1,2,2-tetramethylpropyl hydroperoxide, cyclohexyl hydroperoxide, 4-methylcyclohexyl hydroperoxide, and the like.

For the purposes of this invention R' can be any alkylene, or aralkylene or alkarylakylene group. Generally R' will have from 2 or 3 (if y is 0) to 12 carbon atoms but need not be so limited. Illustrative of R' are alkylene (such as methylene, ethylene, n-hexylene, 2-ethyl-n-hexylene, and the like); arylalkylene (such as phenylethylene, and the like); cycloalkylene (such as 1,4-cyclohexylene, 1,3-cyclohexylene, 1,3-cyclobutylene, and the like), and the like.

For the purpose of the invention R'' can be any alkyl or aralkyl group. Generally R'' will have from 1 to 12 carbon atoms but need not be so limited. Illustrative of R'' are alkyl (such as methyl, ethyl, pentyl, dodecyl, octadecyl, 2-ethylhexyl, and the like); cycloalkyl(such as cyclobutyl, cyclohexyl, 4-methylcyclohexyl, and the like), aralkyl (such as phenylethyl, cumyl, and the like), and the like.

For the purposes of this invention Z can be a hydrolyzable functional radical such as halide (such as chloride, bromide and fluoride); alkoxy (such as methoxy, ethoxy, propoxy, n-dodecyloxy, isopropoxy, 2-chloroethoxy, 2-chloroisopropoxy, and the like); acetoxy, (propioroxy, and the like); amino; alkylamino and arylamino (such as methyl amino, diemthylamino, diethyl amino, phenyl amino, and the like); hydroxy alkoxy (such as beta-hydroxyethoxy, gamma-hydropropoxy, and the like); hydroxyalkoxyalkoxy (such as beta-hydroxyethoxy-ethoxy, omega-hydroxy-(polethyleneoxy)ethoxy, omega-hydroxy-(poly-1,2,-propyleneoxy); oximido; and the like. Z can additionally and alternatively be a monovalent organic hydrocarbon radical, such as generally of from 1 to 8 linear sequential carbon atoms but not necessarily so limited. Illustrative of such monovalent organic radicals are alkyl (e.g., methyl, ethyl, pentyl, octadecyl, 2-ethylhexyl, and the like), cycloalkyl (such as cyclobutyl, cyclohexyl, 4-methylcyclohexyl, and the like), aryl (such as phenyl, 2-napththyl, 2-anthracyl, biphenyl, and the like), alkaryl (such as 4-methylphenyl, 2,4-diethylphenyl, 4-dodecylphenyl, and the like), aralkyl (such as phenylethyl), alkenyl (such as vinyl, allyl, 3-butadenyl, oleyl, and the like), alkadienyl (such as 1-butadienyl-1,4,1-octadecatrienyl-9, 11, 13, 1-neoprenyl, and the like, cycloalkenyl (such as 3-cyclohexenyl), haloalkyl (such as chloromethyl, gamma-chloropropyl, 3,3,3-trifluoropropyl, perfluoropropyl), haloaryl (such as 4-chlorophenyl, 2,4-dichlorophenyl, chloronapthyl), halocycloalkyl (such as 4-chlorophenyl), cyanoalkyl (such as beta-cyanoethyl, gamma-cyanopropyl, and the like); cyanoaryl (such as 4-cyanophenyl); cyanocycloalkyl (such as 4-cyanocyclohexyl, 3-cyanocyclopentyl, and the like); carboxyalkyl (such as beta-carboxyethyl, gamma-carboxypropyl, and the like); carboxyaryl (such as 4-carboxycyclohexyl, 3-carboxycyclopentyl; and the like); isocyanatoalkyl (such as gamma-isocyanatopropyl, delta-isocyanatobutyl, and the like); isocyanatoaryl (such as 4-isocyanatophenyl); isocyanato-cycloalkyl (such as 4isocyanatocyclohexyl); alkyl or aryl carboxalkyl (such as beta-methylcarboxyethyl, gamma-phenyl carboxy propyl, and the like), and the like.

The silyl acyl peroxy compounds of this invention can be used for any of the purposes for which peroxides are generally employed, such as initiators for the polymerization of olefins and as vulcanizing agents for rubbers. For example the hydrolyzable functional silyl acyl peroxides can be used as initiators for the polymerization of monomers having olefin unsaturation such as styrene or methylmethacylate, in which cases the resulting polymer contains hydrolyzable functional silyl acyl end groups. It is understood that these end groups are desirable in forming bonds to polar substrates such as siliceous substrates.

The polyfunctional silyl acyl peroxy compounds of this invention can also be used as coupling agents and binders for polymers, rubbers, metal oxide, siliceous and metallic substrates.

Illustrative of substrates within the purview of this invention are, by way of example, metal substrates, such as aluminum, iron, copper, steel (stainless steel, carbon steel, and the like), magnesium titanium zirconium, nickel, stainless steel alloys, chromium steel alloys, chromium plate, copper, zinc, bronze, brass, gold, platinum, silver, iridium, and the like; metal oxide substrates, such as aluminum oxide, titanium oxide; titanium oxides, lead oxides, copper oxides, iron oxides, beryllium oxides, manganese oxides, tungsten oxides, tantalum oxides, vandium oxides, and the like; nonmetal inorganic oxides, such as silicon oxides (e.g., sand, fly ash, hydrated silica, silica, quartz, aerogels, xerogels, fumed silica, and the like); aluminum silicates (such as clay, asbestos, and the like); glass, in essentially any form (e.g., fiber, plate, granular, spheres, and the like), other inorganic solid salts, such as calcium carbonate, magnesium carbonate, magnesium sulfate, lead chromate, iron chromates; as well as carbonaceous inorganic materials, such as graphite in essentially any form, carbon black; boron nitride; polyaminoboranes; polyphosphinoaminoboranes; and the like.

The polymer substrates may be of solid, natural or synthetic organic material, such as cellulosics, e.g., wood (in any shape, e.g., as wood flour, paper, boards, composites, and the like); cotton, rayon, cellulose acetate, cellulose triacetate, nitrocellulose, and the like, in any form, e.g., particulate, film or fiber; polyamides, such as wool, silk, zein, horse hair, hog's hair, human hair, leather, poly)hexamethyleneadipamide)poly-epsilon-caprolactam, polypryrrolidone; polyesters such as alkyd resins, polymerized linseed oil, oxidized linseed oil and other drying oils, bodied natural oils which are triglycerides of fatty acids, polyethyleneterephthalate, polycyclohexyleneterephthalate, poly-epsilon-caprolacton and the like; organic rubbers, such as natural rubber, such as 1,3-butadiene-styrene copolymers, polysulfide rubbers, ethylacrylate polymers, poly-1, 3-butadiene, poly-1-butene, polyurethane spandex polymers such as a polyester of adipic acid and 1,4-butane diol which is terminated by reaction with bis(4-isocyanatophenyl)methane and this isocyanato prepolymer is chain extended with 1,4-butane diol, or a polyester of poly-epsiloncaprolactone initiated by reaction with diethylene glycol optionally followed by reaction with toluene isocyanate (i.e., mixed isomers of the 2,4- and 2,6-varieties), which prepolymer is capped by reaction with bis(4-isocyanatophenyl) methane and this prepolymer is chain extended with ethylene diamine, or the same type of spandex polymer except that for the caprolactone polyester there is employed a polyether diol, such as poly (oxytetramethylene)glycol and in such cases the same extension may be effected with hydrazine instead of ethylene diamine; copolymers of ethylene and/or propylene and a polyolefin such as, e.g., 1,3-butadiene, 2-ethyldienenorbornene-5 (or 6) and the like; silicone rubbers, such as poly(dimethylsilyloxy) (commonly referred to as dimethylpolysiloxane), copolymers of such siloxane containing vinylsilyl groups and the like; polyolefin resins, such as homopolymers and copolymers of ethylene, propylene, 1-butylene, vinylacetate, vinyl formate, vinyl propionate, vinyl chloride, N-vinyl pyrrolidone, acrylonitrile, styrene, butadiene-1,3 maleic acid, fumaric acid, acrylic acid, methacrylic acid, crotonic acid, alkyl and aryl esters of the aforementioned acid, tetrafluoroethylene, trichlorofluoroethylene, vinyl silanes, and the like; polyaryl ethers and polyarylsufones and copolymers of the two; silicone resins, epoxy resins such as the cycloaliphatic epoxides or the aromatic epoxides, the latter typically being based on the glycidyl ethers of bis phenol A; phenol-foraldehyde resins, melamine-formaldehyde resins, melamine-formaldehyde resins; unreaformaldehyde resins; polycarbonates based on the bis phenol A carbonates or the aliphatic polycarbonates; and the like. Essentially any polymer, rubber, siliceous, metallic or the like substrates may be bonded to each other or themselves utilizing the silyl acyl peroxy compounds of this invention.

Bonding may be effected in a number of ways. For example, the silyl acyl peroxide can be incorporated into a liquid version of the material which is to result in the formation of a solid surface which adheres to another solid surface or which can be coated on either one or both of the surfaces being joined. One may bond glass to glass or aluminum to aluminum or aluminum to essestially any organic resin or polymers just with a solvent solution of the silyl acyl peroxide, provided in each case there is sufficient intimate contact between the surfaces. In every case, the silyl acyl peroxide will act to enhance adhesion when compared to such attempts to adhere absent a bonding aid and simply involving common contact between the materials. Of course, thermosetting or thermoplastic materials can be joined, provided they are compatible, with heat alone, absent the silyl acyl peroxide. But it must be remembered that when such materials are so joined they must typically be in a common plastic state to obtain optimum adhesion, whereas when one employs the silyl acyl peroxide of this invention in either one of the materials, it is not necessary to employ temperatures which will liquify the material, interfacial softening is all that is needed. Thus, one may take two incompatible thermosetting plastics, and provided one makes intimate contact between them and silyl acyl peroxide is provided at the interface, then enhanced bonding or adhesion of the two articles will result.

The following examples are illustrative only and should not be construed in any way so as to limit the invention.

In the following examples, iodometric analyses to measure the active oxygen content of the product silyl acyl peroxides, to determine purity, were performed accordingly to the method of C.J. Pederson, as presented in 23 J.Org.Chem., 252(1958) and said analytical procedure is incorporated herein by reference.

EXAMPLE 1

A solution was prepared by manually adding 30.7 grams of tert-butyl hydroperoxide to 220 grams of benzene. The aforesaid solution was added dropwise during a period of 50 minutes at room temperature to a mixtue consisting of 70 grams of 3-(trimethoxysilyl)propyl isocyanate, 1.0 gram of stannous octoate and 220 grams of benzene. After addition was complete the resultant reactant mixture was mechanically stirred for a total of 2 hours. The reaction exotherm produced a temperature of 36°C. Upon completion of the 2 hour reaction period an infrared spectrophotometric analysis could not detect the presence of 3-(trimechoxysilyl)propyl isocyanate. The benzene was removed by drawing a vacuum of 100mmHg for 60 minutes while the reaction vessel was heated and maintained at 40°C. The resulting reaction product was 100.8 grams of tert-butyl N-[3(trimethoxy silyl)-propyl] peroxy carbamate of 96.6 percent purity as determined by the method of Pederson. This product value represented a 96.7 percent yield.

EXAMPLE 2 a reaction charge was prepared by mixing 70 grams of 3-(trimethoxysilyl) propylisocyanate, 62.1 grams of cumene hydroperoxide of 83.6 percent purity, 1.3 grams of stannous octoate and 700 grams of benzene. The reaction charge was heated to 80°C. and maintained at that temperature for 4 hours during which period the reaction charge was continuously mechanically stirred. Upon completion of the 4 hour reaction period an infrared spectrophotometric analysis could not detect the presence of 3-(trimethoxysilyl)propylisocyanate. The benzene was removed by drawing a vacuum of 400 mm Hg for 60 minutes while maintaining the reaction mixture at 55°-65°C. The resulting reaction product was 132 grams of cumyl N-[3(trimethoxysilyl)propyl] peroxycarbamate of 75.1 percent purity as determined by the method of Pederson. This product value represents 78.6 percent yield of theoretical.

EXAMPLE 3

A reaction charge was prepared by mixing 2.4 grams of trimethoxysilane, 5.0 grams of tert-butyl peroxy-10-undecenoate, 0.005 gram of bis(4-chlorobenzonitrile)dichloroplatinum (II) and 22 grams of benzene. The reaction charge was allowed to stand at 25°C for 40 hours. Upon completion of the 40 hour period infrared spectrophotometric analysis detected only traces of silanic hydrogen. The resulting reaction product was 6.8 grams of tert-butyl-11-(trimethoxysilyl)peroxyundecanoate of 95.0 percent purity as determined by the Pederson analytic method. This product value represented an 87.3 percent yield of theoretical.

EXAMPLE 4

A reaction charge was prepared by mixing 2.70 grams of trichlorosilane, 5.00 grams of tert-butyl-10-undecenoate, 0.005 grams of bis(4-chlorobenzonitrile)dichloroplatinum (II) and 22 grams of benzene. The reaction mixture was allowed to stand at 25°C. for 22 hours. Then an additional 0.005 grams of bis(4-chlorobenzonitrile)dichloroplatinum (II) was added. The reaction mixture was allowed to remain at 25°C. for an additional 72 hours. The benzene was removed by drawing a vacuum of 100 mm Hg for 60 minutes at ambient temperature.

The product yield was 7.2 grams of tert-butyl-11-trichlorosilyl) peroxy undecanoate with a purity of 83.3 percent as determined by the Pederson analytical method. This product value represents a product yield of 77.9 percent of theoretical.

EXAMPLE 5

A reaction charge was prepared by mixing 24.7 grams of trimethoxysilane, 36.9 grams of bis(10-undecenoyl)peroxide, which was prepared by reacting 10-undecenoyl chloride with sodium peroxide, 0.022 grams of bis(4-chlorobenzonitrile) dichloroplatinum (II) and 132 grams of benzene. The benzene was removed by drawing a vacuum of 100 mm Hg for 60 minutes at 25°C. The reaction charge was transferred to a Servall SS-3 centrifuge having an SS-34 rotor and subjected to a centrifugal force at 5000 revolution per minute (rpm) for 30 minutes to separate out the product.

The product yield was 54.0 grams of bis[11-(trimethoxysilyl) undecanoyl] peroxide of 83.0 percent purity, as determined by the Pederson analytical method, which yield represented 72.8 percent of theoretical.

EXAMPLE 6

A reaction charge was prepared by mixing 2.2 grams of trichlorosilane, 3.0 grams of bis(10-undecenoyl) peroxide, 0.00024 grams of 1,3-distyrene-2, 4-dichloro-$\mu$-dichloro-diplatinum (II) and 13.7 grams of toluene. The charge was allowed to stand at 25°C. for 24 hours, during which additional platinum compound in the total amount of 0.0015 part was charged in several increments. The charge was allowed to stand for an additional 90 hours after the last platinum addition. Spectrophotometric analysis indicated only traces of silanic hydrogen. The toluene was removed in vacuo of 20 mm Hg for 60 minutes, at ambient temperature. The yield was 5.0 grams, bis[11-(trichlorosilyl)undecanoyl] peroxide. Pederson analysis indicated a purity of 92.5 percent which represented a yield of 89.0 percent of theoretical.

EXAMPLE 7

A reaction charge was prepared by mixing 100 grams of polysiloxane having the formula $HMe_2SiO)Me_2SiO)_{175}SiMe_2H$, 4.52 grams of 9-decenyl isocyanate and 0.002 grams of 1,3-distyrene-2,4-dichloro-$\mu$-dichlorodiplatinum (II). The charge reacted causing a temperature rise 6°C. above the ambient temperature (25°C.). Infrared spectrophotometric analysis indicated that terminal silanic hydrogen of the polysiloxane was consumed within 13 minutes. After 55 minutes, the charge was evacuated at 5 mm Hg 150°C. for 45 minutes. Infrared analysis indicated the presence of isocyanate groups, but no SiH groups. Cumene hydroperoxide, 3.5 grams, (83 percent purity) and 0.094 grams of triethylamine were added to the charge. The mixture was then heated to 80°C. and maintained at that temperature for 2 hours. The charge was evacuated by drawing a 0.5 mm Hg vacuum for about 45 minutes. The Pederson analytical method was used to indicate a number average molecular weight of 13,900 for the peroxide-endblocked polysiloxane.

EXAMPLE 8

A reaction charge was prepared by mixing 50 grams of the polysiloxane $HMe_2SiO(Me_2SiO)_{37.5}SiMe_2H$, 7.5 parts of bis(10-undecenoyl)peroxide and 8.7 grams of a toluene solution containing 0.003 gram of 1,3-distyrene-2,4-dichloro-$\mu$-dichloro-diplatinum (II). The charge allowed to stand at 25°C. for about 43 hours. At the end of this reaction period, silanic hydrogen could not be detected by infrared spectrophotometry. The toluene was removed in vacuo at 20 mm Hg for 60 minutes at ambient temperature. Pederson analysis indicated retention of 85.2 percent of the active oxygen in the 10-undecenyl peroxy end-blocked polysiloxane product.

EXAMPLE 9

A reaction charge was prepared by mixing 10.0 grams of the peroxy end-blocked polysiloxane as prepared in Example 9 with 30.0 grams of inhibitor-free styrene and 86 grams of xylene. The charge was heated for 6 hours at 120°C. in an argon atmosphere. The charge became turbid and separated into two phases on standing. Evaporation of the solvent from the upper phase yielded a nearly clear, soft, rubbery polymer. Elemental analysis indicated that the polymer contained 64.2 percent polysiloxane by weight bond on the weight of the polymer. This would indicate a copolymer number average molecular weight of 21,600 since the molecular weight of the polysiloxane block is 13.900. The polystyrene contributed the balance, that is 7,700. The average molecular weight of the polystyrene blocks, therefore, would be about 3,850, since there are two blocks per molecule.

EXAMPLE 10

A series of five test tubes was sparged with argon and charged with inhibitor-free styrene and with the peroxyorganopolysiloxane of Example 10. Total charge was 5.0 gram increments (that is a range of 40–80 weight percent based on the weight of the charge). The tubes were heated in a water bath at 91°–94°C. for 6 hours. Each sample was dissolved in about 26 parts of benzene, precipitated in 790 parts of methanol and dried. The results are shown below in Table I;

TABLE I

| percent polysiloxane (per weight of polymer) | number average molecular weight | | | physical form |
|---|---|---|---|---|
| | polysiloxane block | Co-polymer | polystyrene block | |
| 20.6 | 3200 | 15,500 | 6,150 | hard, hazy wax |
| 26.8 | 3200 | 12,000 | 4,400 | hard, opaque wax |
| 35.4 | 3200 | 9,000 | 2,900 | brittle, hazy wax |
| 44.4 | 3200 | 7,200 | 2,000 | soft wax |
| 58.1 | 3200 | 5,500 | 1,150 | soft, rubbery solid |

EXAMPLE 11

A glass ampoule was charged with 25 grams of inhibitor-free styrene and 0.25 grams of cumyl N-[3-trimethoxysilyl)propyl] peroxycarbamate (as prepared in Example 2). The charge was frozen in liquid nitrogen and evacuated at 1.0 mm Hg for 15 minutes. The ampoule was then filled with argon and the contents were allowed to melt. The solid-liquid transition cycle was repeated twice. The ampoule was sealed and immersed in an oil bath at 90°C for 16 hours, during which the charge polymerized to a yellow solid. The solid was dissolved in 350 grams of benzene and was filtered through No. 3 paper. It was precipitated by dropwise addition to 3200 parts of stirred methanol. The product was collected on a No. 3 filter paper and dried. Silicon content of the product was 0.066 weight percent. This corresponds to a number average molecular weight of about 22,000.

Benzene solutions containing 4 weight percent of the experimental polymer is prepared above and, as a control, of commercial polystyrene were prepared. Films were cast on glass plates and allowed to evaporate. The plates were heated in an oven for one hour at 130°–140 °C. The commercial polymer was released from the plate within one minute after immersion in water at about 25°C. The prepared experimental polymer remained bound to the glass even after a 21 hour immersion at 25°C.

EXAMPLE 12

A test tube was sparged with argon and charged with 10.2 grams of methyl methacrylate (distilled, b.p. 53°C. at 133 mm Hg) and 0.127 grams of bis[11-(trimethoxysilyl)undecanoyl] peroxide. The tube was heated in a water bath at 70°C. The temperature was increased to 83°C. The charge became viscous within 24 minutes (at 83°C.) and solid within 43 minutes (at 83°C.).

Heat was maintained for a total of 3 hours. The resultant polymer was dissolved in chloroform and precipitated in petroleum ether. The precipitate was separated by filtration, washed with pentane and dried, yielding 8.5 parts of a fluffy white solid. Analysis indicated 0.12 weight percent silicon. The number average molecular weight was 23,400 (assuming one silicon atom per molecule).

A film which was cast on glass from chloroform solution and oven-dried at 140°C. for about 20 minutes to form a bond which was resistant to water immersion at 25°C. for an indefinite period.

EXAMPLE 13

Cumyl N-[3-(trimethoxysilyl)propyl]peroxycarbamate (as prepared in Example 2) was applied as a 0.5 weight percent methanol solution on 181-112 glass fabric. A dry laminate of alternating plies of 12 sheets of 10 mil polypropylene and 11 sheets of glass cloth was prepared and placed in a platen press preheated to 400°F. The laminate was compared to 0.125 inch heat and pressure was maintained for 30 minutes. The press was then cooled to amient temperature and the laminate removed. The resultant laminate had a nominal thickness of 0.125 inch and contained 40±2 weight percent polypropylene based on the weight of laminates. Specimens were cut to 4 inches by ½ inch rectangles, with the long dimension along the warp of the fabric. Flexural strengths were determined according to ASTM D790-63. Tests were conducted on dry samples both at room temperature and at 200°F. Tests were also conducted at room temperature on samples that had been soaked in distilled water for 16 hours at 120°F. Tests were also conducted on control samples prepared from untreated glass fabric. The results are listed in Table II.

TABLE II

Flexural Strength (psi.)

| | Room Temperature | 200°F. | Water-Soaked |
|---|---|---|---|
| Control | 13,000 | 4,800 | 10,000 |
| Test Sample | 23,000 | 14,000 | 20,000 |

EXAMPLE 14

Aluminum, brass and steel strips were wiped clean with methanol and allowed to dry. Strips of cured silicone rubber were treated in the same manner. Each surface was coated with solution containing 5 parts of tert-butyl N-[3-(trimethoxysilyl) propyl]peroxycarbamate (see Example 1) in 100 parts by volume of a 2-propanol solution which contained 2 parts by volume of added water. The coatings were air-dried. The rubber and metal were joined and heated in a platen press at 360°F. and about 770 psi. for 10 minutes. The specimens were then removed, cooled and checked for adhesion by peel strength testing. Cohesive failure was obtained with all three metals.

EXAMPLE 15

Aluminum, steel and glass plaques were "painted" with a toluene solution containing 5 weight percent tert-butyl N-[3-trimethoxysilyl)propyl]peroxycarbamate. The painted plaques allowed to dry. The coated samples were then contacted with 1/16 inch polyethylene flat stock in a press at 2500 psi. and 400°F. for 10 minutes. A bond was formed with all three substrates. The steel and aluminum retained a bond after a 24 hour immersion in water at room temperature.

EXAMPLE 16

Aluminum, steel and glass plaques were "painted" with a toluene solution containing 5 weight percent cumyl N-[3-(trimethoxysilyl)propyl]peroxycarbamate and allowed to dry. The coated samples were then contacted with 1/16 inch polyethylene flat stock in a press at 2500 psi. and 400°F. for 10 minutes. A bond was formed to all three substrates. The glass and the aluminum retained a bond after a 24 hour immersion in water at room temperature.

What is claimed is:

1. A copolymer of a) a polysiloxane of a silyl acylperoxy compound containing at least one of the following structures;

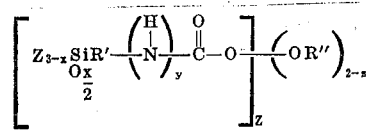

wherein R' is an alkylene, aralkylene or alkarylalkylene radical, R'' is an alkyl or aralkyl radical, Z is a monovalent hydrolyzable radical or monovalent organic radical bonded to the silicon atom by a carbon to silicon bond and wherein x is an integer from 0 to 3 inclusive, and provided that when x is greater than zero, the oxygen atom is in turn bonded to another silicon whereby to form a siloxane, wherein said siloxane and any remaining siloxane units in said siloxane composition are of the formula;

wherein Z' is Z or

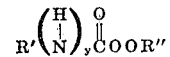

wherein Z, R', R'' and y are as herein defined and w is 1 to 3 inclusive; y is 0 to 1, and z is 1 or 2; with the proviso that when y is 0, the acyl carbonyl carbon is bonded to R', the R' having at least 2 sequential carbon atoms separating the acyl carbonyl carbon atom from the silicon atom; with the further proviso that when y is 1, z is 1 and the nitrogen atom is bonded to a carbon atom of R', the R' having at least 3 sequential carbon atoms separating the nitrogen from the silicon atom, and b) an ethylenically unsaturated monomer.

2. The copolymer of claim 1 wherein the polysiloxane has the general formula:

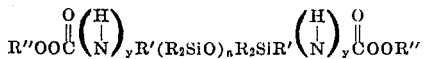

wherein R is alkyl radical of from about one to twelve carbon atoms and $a$ is a number from about 2 to 500.

3. The copolymer of claim 1 wherein the polysiloxane has the general formula:

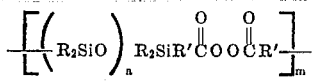

wherein R is an alkyl radical of from about one to twelve carbon atoms, $m$ is a number from about 10 to 200, $a$ is a number from 2 to 500 and the terminal endblocking groups are resultant monovalent organic radicals from the formation of said polysiloxane.

4. The copolymer of claim 2 wherein said ethylenically unsaturated monomer is a vinyl ester.

5. The copolymer of claim 2 wherein said ethylenically unsaturated monomer is an alkene.

6. The copolymer of claim 5 wherein said ethylenically unsaturated monomer is an aryl alkene.

7. The copolymer of claim 6 wherein said ethylenically unsaturated monomer is styrene.

8. The copolymer of claim 2 wherein said ethylenically unsaturated monomer is methyl methacrylate.

9. The copolymer of claim 1 wherein the copolymer is an ABA copolymer wherein A is a repeating unit resulting from polymerization of the ethylenically unsaturated monomer and B is the polysiloxane.

10. A method for polymerization of an ethylenically unsaturated monomer which comprises heating in a reaction environment such monomer in the presence of an initiator which is a silyl acylperoxy compound containing at least one of the following structures;

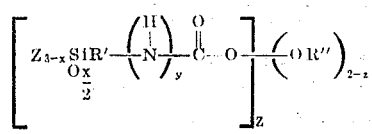

wherein R' is an alkylene, aralkylene or alkarylalkylene radical, R" is an alkyl or aralkyl radical, Z is a monovalent hydrolyzable radical or monovalent organic radical bonded to the silicon atom by a carbon to silicon bond and wherein $x$ is an integer from 0 to 3 inclusive, and provided that when $x$ is greater than zero, the oxygen atom is in turn bonded to another silicon whereby to form a siloxane, wherein said siloxane and any remaining siloxane units in said siloxane composition are of the formula;

wherein Z' is Z or

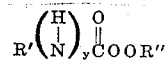

wherein Z, R', R" and $y$ are as herein defined and $w$ is 1 to 3 inclusive; $y$ is 0 to 1, and $z$ is 1 or 2; with the proviso that when $y$ is 0, the acyl carbonyl carbon is bonded to R', the R' having at least 2 sequential carbon atoms separating the acyl carbonyl carbon atom from the silicon atom; with the further proviso that when $y$ is 1, $z$ is 1 and the nitrogen atom is bonded to a carbon atom of R', the R' having at least 3 sequential carbon atoms separating the nitrogen from the silicon atom; and the reaction environment is inert to said polymerization.

* * * * *